United States Patent
Cao et al.

(10) Patent No.: US 10,598,488 B2
(45) Date of Patent: Mar. 24, 2020

(54) METHOD AND APPARATUS FOR RAPIDLY ROTATING IMAGING WITH A SUPER LARGE SWATH WIDTH

(71) Applicant: Harbin Institute of Technology, Harbin, Heilongjiang (CN)

(72) Inventors: Xibin Cao, Heilongjiang (CN); Guang Jin, Heilongjiang (CN); Feng Wang, Heilongjiang (CN); Wei Xu, Heilongjiang (CN)

(73) Assignee: HARBIN INSTITUTE OF TECHNOLOGY, Harbin, Heilongjiang (CN)

( * ) Notice: Subject to any disclaimer, the term of this patent is extended or adjusted under 35 U.S.C. 154(b) by 111 days.

(21) Appl. No.: 15/542,207

(22) PCT Filed: Sep. 1, 2016

(86) PCT No.: PCT/CN2016/097809
§ 371 (c)(1),
(2) Date: Jul. 7, 2017

(87) PCT Pub. No.: WO2018/014433
PCT Pub. Date: Jan. 25, 2018

(65) Prior Publication Data
US 2019/0383607 A1    Dec. 19, 2019

(30) Foreign Application Priority Data

Jul. 18, 2016    (CN) .......................... 2016 1 0565836

(51) Int. Cl.
*B64C 1/00*    (2006.01)
*G01C 11/02*    (2006.01)
*H04N 5/232*    (2006.01)

(52) U.S. Cl.
CPC ....... *G01C 11/025* (2013.01); *H04N 5/23299* (2018.08)

(58) Field of Classification Search
CPC ........ B64C 2201/123; B64C 2201/127; C64C 2101/00
See application file for complete search history.

(56) References Cited

U.S. PATENT DOCUMENTS 3,560,642 A * 2/1971 Schroader .............. H04N 7/005
  348/147
4,886,222 A * 12/1989 Burke ..................... B64C 11/00
  244/1 R
(Continued)

FOREIGN PATENT DOCUMENTS

CN    102063558 A    5/2011
CN    103886208 A    6/2014
(Continued)

OTHER PUBLICATIONS

Chen, Xixi; International Search Report and Written Opinion of the International Searching Authority, issued in International Application No. PCT/CN2016/097809; dated Mar. 21, 2017; 14 pages, including English translation of International Search Report.

(Continued)

*Primary Examiner* — Pankaj Kumar
*Assistant Examiner* — Timothy R Newlin
(74) *Attorney, Agent, or Firm* — Ulmer & Berne LLP

(57) ABSTRACT

There is proposed a method and an apparatus for rapidly rotating whiskbroom imaging with a super large breadth. The method includes: step 1 of calculating a breadth $L_1$ of a flight direction; step 2 of setting a critical value of a distance $L_2$ between centers of an optical axis of the detector on a track of the subsatellite point on a surface of the earth at two times of imaging as being the breadth $L_1$ of the flight direction; and step 3 of calculating a spin velocity threshold (Continued)

of the detector in the direction along the orbit and setting spin velocity of the detector in the direction along the orbit as being larger than or equal to the threshold.

18 Claims, 5 Drawing Sheets

(56) References Cited

U.S. PATENT DOCUMENTS

| | | | | | |
|---|---|---|---|---|---|
| 5,420,789 | A | * | 5/1995 | Fulton | G01C 11/025 250/334 |
| 5,559,334 | A | * | 9/1996 | Gupta | G01C 11/02 250/358.1 |
| 5,768,040 | A | * | 6/1998 | MacEnka | G01J 3/02 356/328 |
| 5,790,188 | A | * | 8/1998 | Sun | G01J 3/2823 348/143 |
| 2002/0012071 | A1 | * | 1/2002 | Sun | H04N 5/33 348/578 |
| 2005/0083412 | A1 | * | 4/2005 | Murphy | H04B 7/18595 348/211.2 |
| 2005/0177307 | A1 | * | 8/2005 | Greenfeld | F41G 5/14 701/409 |
| 2007/0189598 | A1 | * | 8/2007 | Chen | G01C 11/025 382/154 |
| 2008/0035797 | A1 | * | 2/2008 | Defendini | B64G 1/244 244/165 |
| 2010/0053609 | A1 | * | 3/2010 | Chrisp | G01J 3/02 356/328 |
| 2011/0049302 | A1 | * | 3/2011 | Vance | B64G 1/1021 244/158.4 |
| 2014/0168434 | A1 | * | 6/2014 | Gerlach | H04N 7/183 348/144 |
| 2016/0133019 | A1 | * | 5/2016 | Wagner | G01C 11/02 348/144 |
| 2017/0078553 | A1 | * | 3/2017 | Sron | H04N 5/2351 |
| 2018/0251239 | A1 | * | 9/2018 | Blanc-Paques | B64G 1/1021 |

FOREIGN PATENT DOCUMENTS

| | | |
|---|---|---|
| CN | 103983254 A | 8/2014 |
| CN | 104298887 A | 1/2015 |
| CN | 104698849 A | 6/2015 |
| WO | 2018014433 A1 | 1/2018 |

OTHER PUBLICATIONS

Yang, Y. et al.; ISAR Imaging for Rapidly Spinning Targets; 2nd Asian-Pacific Conference on Synthetic Aperture Radar, Oct. 26-30, 2009; pp. 614-617.

Wang, Yikun; Research on Area Array Whiskbroom Width Imaging Technology; Science-Engineering (B), China Doctoral Dissertations Full-Text Database, No. 2016/01; Jan. 15, 2016; 116 pages including English translation of cover page and abstract.

Chen, Jinwei; Research on Agile Satellite Remote Sensing Image Registration and Mosaic Technology; Electronic Technology & Information Science, China Doctoral Dissertations Full-Text Database, No. 2014/09, Sep. 15, 2014; 160 pages including partial English translation of cover page and English translation of abstract.

* cited by examiner

METHOD AND APPARATUS FOR RAPIDLY ROTATING IMAGING WITH A SUPER LARGE SWATH WIDTH

TECHNICAL FIELD

The present invention relates to a field of imaging technology, and more particularly, to a method and apparatus for rapidly rotating whiskbroom imaging with a super large swath width and computer readable medium therefor.

BACKGROUND

Pushbroom imaging for, for example, a civil satellite is generally done by arranging a detector for imaging in a flight direction perpendicular to the satellite and collecting a row of images at one time when the satellite flies forward. The range size of the image depends on a range of a view field of a charge-coupled device (CCD) in the detector. Generally, multiple-CCD splicing or simultaneous increase of the whiskbroom ability of the camera side can achieve a wider range of the view field. This is the common method of optical remote sensing satellite imaging. Satellite whiskbroom imaging is to use mirrors to reflect the light into the detector, and use the mirrors to move back and forth to collect a measured value on one pixel. This part for moving in the imaging method is very expensive and easy to be damaged, and the range of the view field is limited.

Currently, conventional satellites use static pushbroom imaging or large-angle dynamic push-broom imaging. Chinese patent application No. CN201410151609.9 titled as "A Maneuvering Imaging Satellite Attitude Control Method Based on Incremental Drift Angle", relates to a maneuvering imaging satellite attitude control method, for selecting the current target attitude of the satellite as a reference, calculating the increment of the drift angle, and using the updated reference attitude matrix as the target attitude matrix at the time of the attitude control, so that the satellite attitude can track the target attitude. Chinese Patent Application No. CN201410163903.1 titled as "A New Agile Satellite Maneuvering Imaging Method", which establishes a CCD image plane in a satellite model, calculates the image motion velocity vector and the drift angle by projection, and controls the yaw angle of the satellite for drift angle correction, to meet the maneuvering imaging requirements, to achieve dynamic imaging which the satellite opens the optical payload to perform the imaging during a triaxial attitude maneuvering process. Chinese Patent Application Publication No. CN201510466057.5 titled as "Mirror Swing Wide-Width Imaging System and Imaging Method" provides a mirror swing wide-width imaging system which extends the imaging view field of a visible light area array imaging camera by swinging the rotation the mirror, for the visible light area array imaging camera to perform multi-angle capturing in the width direction of the subsatellite point.

The above-mentioned technical solutions can only be used for the satellites with static pushbroom imaging, large-angle dynamic pushbroom imaging or satellite static mirror swing imaging, but cannot meet requirements for ground region super large swath width imaging, and cannot solve a seamless splicing imaging problem between imaging regions of adjacent two orbits of a single satellite.

SUMMARY

The object of the present invention is to solve the problem that the satellite can only use static pushbroom imaging, large-angle dynamic pushbroom imaging or satellite static mirror swing imaging, but cannot satisfy the ground region super large swath width imaging, and the seamless splicing imaging problem between imaging regions of adjacent two orbits of a single satellite. There is proposed a method for rapidly rotating whiskbroom imaging with a super large swath width.

The invention proposes a method for achieving super large swath width whiskbroom imaging by rapid rotation of satellites on the basis of conventional satellite pushbroom imaging and whiskbroom imaging. The linear array CCD and the flight directions of the satellite are parallel, and performing the whiskbroom and pushbroom at the same time by the detector continuously spinning for 360°, the satellite's imaging coverage on the ground can be maximized.

According to an aspect of the present invention, there is provided a method for rapidly rotating whiskbroom imaging with a super large swath width, characterized in that the method comprising:

step 1 of calculating a range of view field $L_1$ of a detector according to a viewing angle $\eta$ of the detector and a height h of an orbit of the satellite, representing a swath width $L_1$ of a flight direction;

step 2 of setting a distance $L_2$ between centers of an optical axis of the detector on a track of the subsatellite point on a surface of the earth at two times of imaging as being less than or equal to the swath width $L_1$ of the flight direction, wherein a critical value of $L_2$ is the swath width $L_1$ of the flight direction; and step 3 of taking the critical value of $L_2$ as being $L_1$, according to the following formula, calculating a spin velocity threshold of the detector in the direction along the orbit:

$$v_Z = \frac{\Omega \times (R+h) \times 360°}{L_2}$$

wherein, $\Omega$ is an angular velocity of the satellite on the orbit, h is the height of the orbit of the satellite, and R is the radius of the earth, and the spin velocity of the detector around the direction along the orbit is set to be greater than or equal to the spin velocity threshold $v_Z$.

So, according to the embodiments of the present invention, there is no gap between the two adjacent imaging regions for the detector, by setting the spin velocity around the direction along the orbit of the detector to be greater than or equal to the spin velocity threshold $v_Z$. If the spin velocity around the direction along the orbit of the detector is set to be below $v_Z$, there may be a gap between the two imaging regions.

According to another aspect of the present invention, there is provided an apparatus for rapidly rotating whiskbroom imaging with a super large swath width, characterized in that the apparatus comprises:

a detector for imaging;

a processor for image processing, coupled with a storage; and the storage, coupled with the processor, storing computer executable instructions when run by the processor, to execute a method comprising the following steps:

step 1 of calculating a range of view field $L_1$ of a detector according to a viewing angle $\eta$ of the detector and a height h of an orbit of the satellite, representing a swath width $L_1$ of a flight direction;

step 2 of setting a distance $L_2$ between centers of an optical axis of the detector on a track of the subsatellite point on a surface of the earth at two times of imaging as being less than or equal to the swath width $L_1$ of the flight direction, wherein a critical value of $L_2$ is the swath width $L_1$ of the flight direction; and step 3 of taking the critical value of $L_2$ as being $L_1$, according to the following formula, calculating a spin velocity threshold of the detector in the direction along the orbit:

$$v_Z = \frac{\Omega \times (R+h) \times 360°}{L_2}$$

wherein, $\Omega$ is an angular velocity of the satellite on the orbit, h is the height of the orbit of the satellite, and R is the radius of the earth, and the spin velocity of the detector around the direction along the orbit is set to be greater than or equal to the spin velocity threshold $v_Z$.

According to another aspect of the present invention, there is provided a non-transitory computer readable medium, storing computer executable instructions thereon, the computer executable instructions, when being run by a processor, performing a method for rapidly rotating whiskbroom imaging with a super large swath width, characterized in that the method comprises:

step 1 of calculating a range of view field $L_1$ of a satellite's detector according to a viewing angle η of the detector and the orbital altitude h of the satellite, representing a swath width $L_1$ of a flight direction;

step 2 of setting a distance $L_2$ between centers of an optical axis of the detector on a track of the sub-satellite point at two times of imaging as being less than or equal to the swath width $L_1$ of the flight direction, wherein a critical value of $L_2$ is the swath width $L_1$ of the flight direction; and step 3 of taking the critical value of $L_2$ as being $L_1$, according to the following formula, calculating a spin velocity threshold of the detector in the direction along the orbit:

$$v_Z = \frac{\Omega \times (R+h) \times 360°}{L_2}$$

wherein, $\Omega$ is an angular velocity of the satellite on the orbit, h is the height of the orbit of the satellite, and R is the radius of the earth, and in the step 3, the spin velocity of the detector around the direction along the orbit is set to be greater than or equal to the spin velocity threshold $v_Z$.

The invention proposes a method for achieving super large swath width whiskbroom imaging by rapid rotation of satellites on the basis of conventional satellite pushbroom imaging and whiskbroom imaging. The linear array CCD and the flight directions of the satellite are parallel, and by the detector continuously spinning for 360° with the fast rotation velocity of 1~10°/s; performing the whiskbroom and pushbroom at the same time, the satellite's imaging coverage on the ground can be maximized so as to achieve super large swath width whiskbroom imaging with thousands of kilometers for satellites in middle and low orbits.

With the conventional pushbroom imaging and whiskbroom imaging, if it is required to completely cover a certain region, it is necessary to repeatedly visit the region several times, that is, multi-orbit data splicing; although the coverage capacity for the region can be increased with the whiskbroom capacity, the temporal resolution and coverage capacity for one-time acquiring ground data cannot meet current task requirements of the rapid response of the satellite.

The invention takes the maneuver ability and imaging capability of the satellite into account, and according to the changes of the attitude angle and the attitude angular velocity of the satellite's dynamic imaging and the influence of the dynamic changes on the imaging, a method for achieving one-time imaging with large range of coverage, by making the optical axis of the detector rotate in the forward direction of the satellite to perform imaging in the direction along the orbit or not along the orbit, during the flight of the satellite is designed. The invention discloses a method and an apparatus for rapidly rotating whiskbroom imaging with a super large swath width for the satellite, which is for the problem of limited swath width in the pushbroom imaging and whiskbroom imaging methods used in the traditional remote sensing satellite. In the satellite flight process, the detector's axis goes forward slowly with the advance of the satellite; as the detector rotates with a uniform speed for 360°, moving left or right, the swath width of the imaging in the direction along the orbit or not along the orbit is made larger, to achieve a purpose of wide coverage range imaging. The method of the invention is simple, reliable and easy to perform, and expands the pushbroom and whiskbroom imaging ranges, the application field of the pushbroom and whiskbroom satellites. The present invention is the first reliable method for the rapidly rotating whiskbroom imaging with a super large swath width for the satellite with the large coverage area for expanding the imaging range.

The rotation of the detector can be achieved by the detector rotating relatively to a satellite platform or with an overall rotation of the whole satellite structure.

In order to achieve a large region detection on the ground by the satellite in a case of satellite advance and earth rotation, a satellite attitude control system can guarantee the detector to continuously rotate with a uniform speed for 360°. When imaging, the satellite attitude control system can control the satellite body timely coordinate system with respect to the three-axis attitude angle (roll angle φ, pitch angle θ, and yaw angle ψ) to ensure the detector to spin with a uniform speed, the selection of the spin velocity should ensure that during the process of the whiskbroom, there is no gap between the adjacent imaging regions, that is, to guarantee there is no gap between the imaging region 1 and the imaging region 2, as shown in FIG. 2.

BRIEF DESCRIPTION OF THE DRAWINGS

In order to more clearly illustrate the embodiments of the present invention or the technical solutions in the prior art, the following drawings, which are to be used in the description of the embodiments or the prior art, will be briefly described. It will be apparent that the drawings in the following description are some embodiments of the present invention, and other drawings may be obtained by those of ordinary skill in the art without doing inventive work.

DETAILED DESCRIPTION

Figure 1:
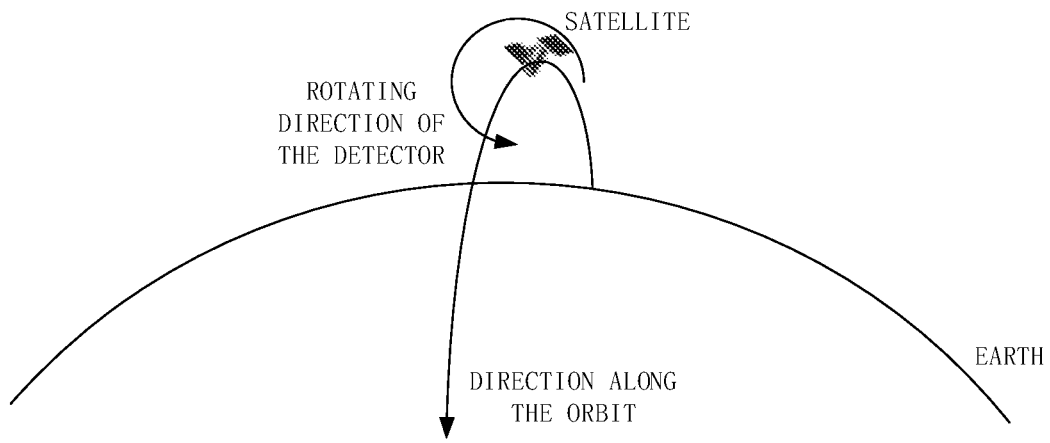
FIG. 1 is a schematic diagram of a satellite spin flight proposed in a specific implementation 1.
Figure 2:
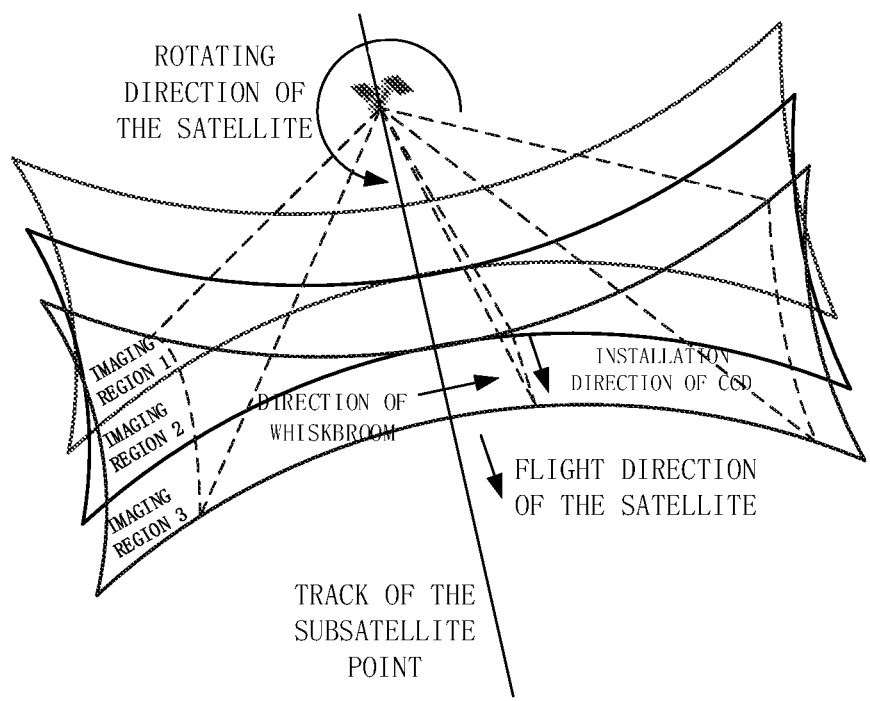
FIG. 2 is a schematic diagram of a detector coverage region proposed in the specific implementation 1.
Figure 4:
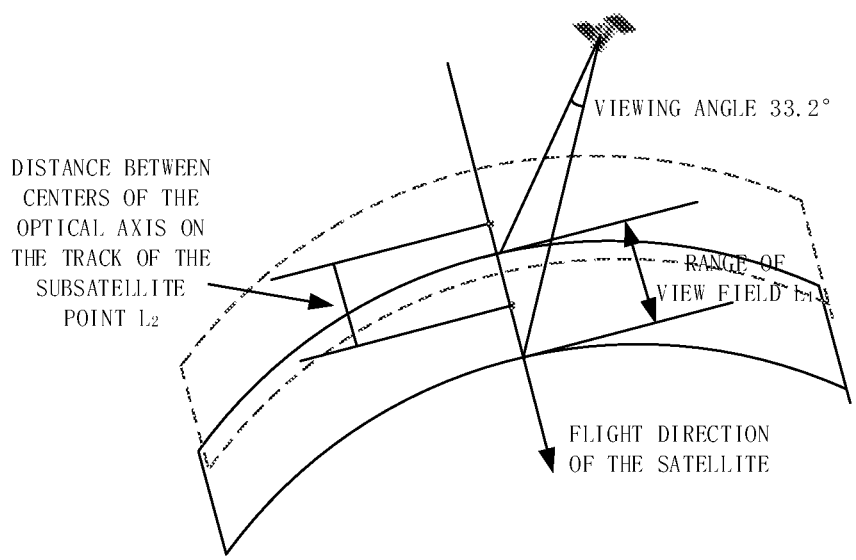
FIG. 4 is a schematic diagram of the calculation of the swath width in the direction along the orbit proposed in the specific implementation 1.

A specific implementation 1: a method for rapidly rotating whiskbroom imaging with a super large swath width of the present implementation is characterized in that the method comprises the following steps:

step 1 of calculating a range of view field $L_1$ of a satellite's detector according to a viewing angle η of the detector and a height h of an orbit of the satellite, representing a swath width $L_1$ of a flight direction, as shown in FIG. 4;

step 2 of setting a distance $L_2$ between centers of an optical axis of the detector on a track of the subsatellite point on a surface of the earth at two times of imaging as being less than or equal to the swath width $L_1$ of the flight direction, thus, it is considered that a critical value of $L_2$ is the swath width $L_1$ of the flight direction, and this is because there being no gap between the two adjacent imaging regions of the detector can achieve a super large swath width, and the imaging regions can be seen in FIG. 2; and step 3 of taking the critical value of $L_2$ as being $L_1$, according to the following formula, calculating a spin velocity threshold of the detector in the direction along the orbit:

$$v_Z = \frac{\Omega \times (R+h) \times 360°}{L_2}$$

wherein, Ω is an angular velocity of the satellite on the orbit, h is the height of the orbit of the satellite, and R is the radius of the earth, and the spin velocity of the detector around the direction along the orbit is set to be greater than or equal to the spin velocity threshold $v_Z$.

So, when the spin velocity of the detector around the direction along the orbit is larger than or equal to the threshold $v_Z$, it is satisfied that there is no gap between the two adjacent imaging regions of the detector, but if the spin velocity of the detector around the direction along the orbit is smaller than the threshold $v_Z$, there may be a gap between the two adjacent imaging regions, and the super large swath width imaging cannot be achieved.

Based on this, the resolution of the ground surface of the detector is largely related to the size of its whiskbroom angle, so with the method for rapidly rotating whiskbroom imaging with a super large swath width for the satellite can provide a large range of the whiskbroom angle by the 360° rotation of the detector, but it is not true that the larger the whiskbroom angle is, the higher the resolution of the detector is. Only in a certain range of the whiskbroom angle, in the same orbit condition, the larger the whiskbroom angle is, the higher the resolution of the detector is. Taking two aspects of the requirements of the high resolution and ground strap seamless splicing into account, it may be necessary to for the imaging swath width and the resolution $A_c$ to constrain each other.

Figure 5:
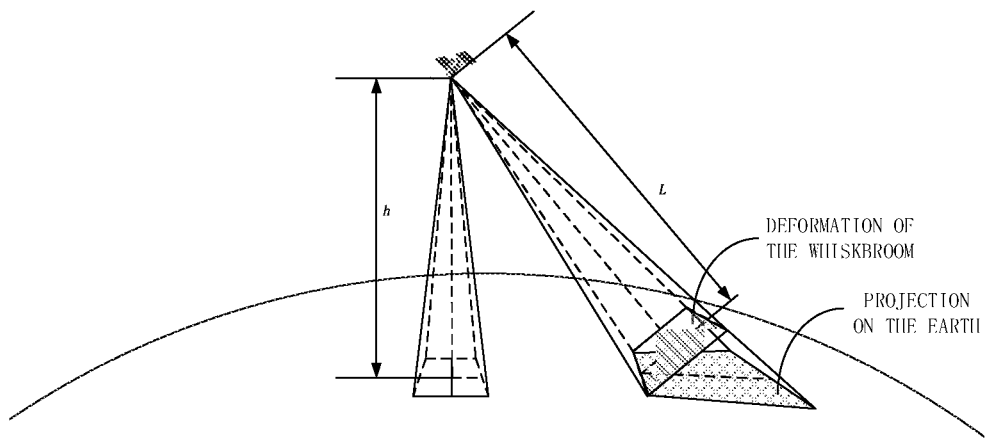
FIG. 5 is a schematic diagram of a resolution reduction, to which a certain whiskbroom angle imaging corresponding, proposed in the specific implementation 1.

This is because when the whiskbroom angle of satellite is very large, the degree of the tangency between the satellite and the earth's surface increases, in addition to the change of the satellite resolution with the change of the object distance of the whiskbroom, the projection angle of the satellite on the ground also increases, the geometric resolution corresponding to the imaging has serious deformation, so there will be a serious decline in the resolution, as shown in FIG. 5; at this point, it may be necessary to reduce or eliminate the deformation of the geometric resolution corresponding to the imaging.

Figure 6:
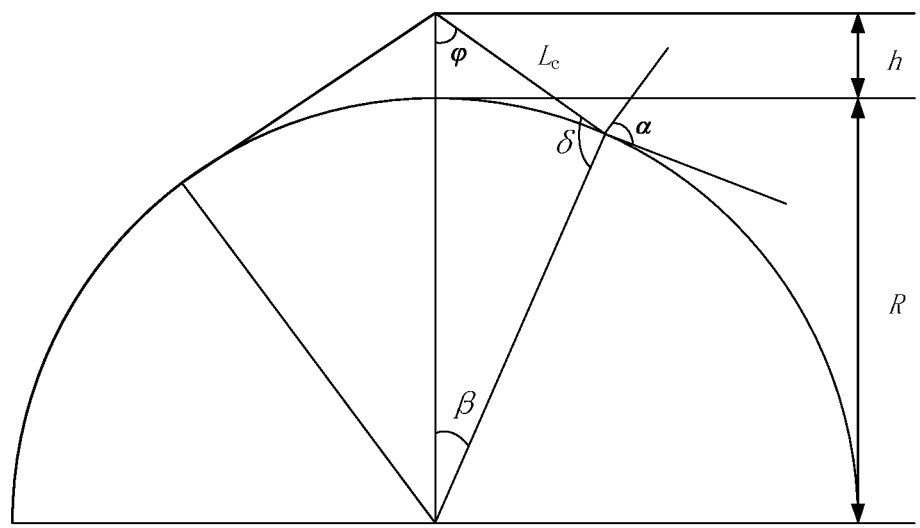
FIG. 6 shows the correspondence between the satellite whiskbroom angle and the ground imaging resolution proposed by the implementation.

Thus, the method may also include:

step 4 of combining inherent characteristic parameters of the detector to select different swing angles to calculate a corresponding resolution $A_c$ when the detector achieves the imaging with a super large swath width under various orbit conditions; the correspondence between the swing angles and the resolutions of the satellite is shown in FIG. 6; wherein, the inherent characteristic parameters of the detector include a pixel size and a focal length;

step 5 of calculating the CCD's line frequency $F_p$ according to the detector's spin velocity threshold $v_Z$ and the resolution $A_c$, and this is because the spin velocity threshold $v_Z$ of the detector and the resolution $A_c$ also determine the amount of the CCD's line frequency $F_p$, while the CCD devices all have their own limit line frequency, and the detector cannot perform normal imaging when going beyond the limit line frequency:

$$F_p = \frac{\sqrt{(v_Z \times L_c)^2 + (\Omega \times (R+h))^2}}{A_c}$$

Figure 7:
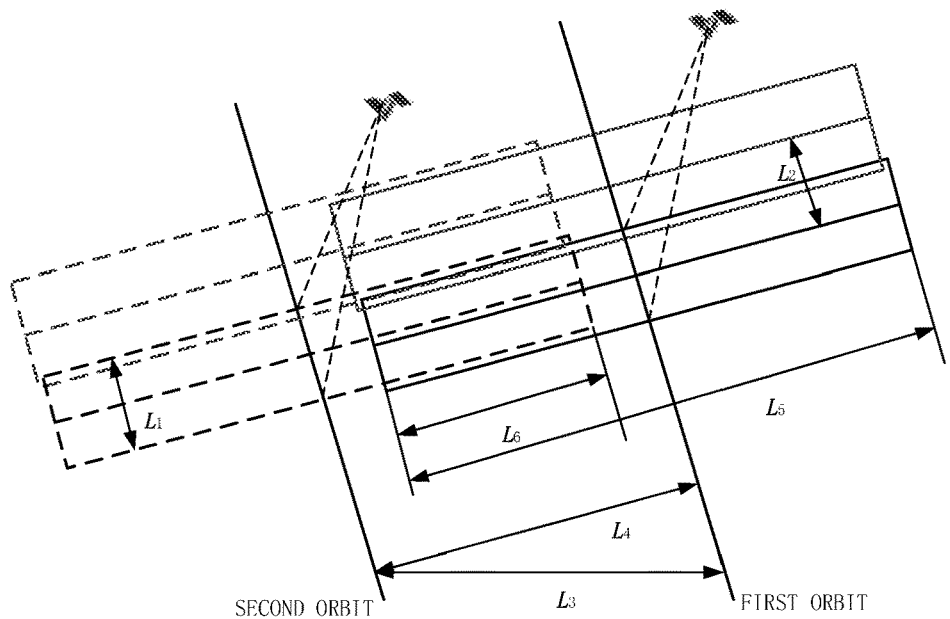
FIG. 7 is a schematic diagram of a two-orbit splicing proposed in the embodiment.

Which $L_c$ is an object distance, step 6 of calculating a curve distance $\overset{\frown}{AB}$ between A and B points on a curve of the orbit of the satellite to which a central angle 2θ corresponds, according to the height h of the orbit of the satellite and the radius of the earth R, wherein the curve distance $\overset{\frown}{AB}$ represents the swath width $L_5$ perpendicular to the orbit of the satellite;

wherein in step 7, as shown in FIG. 2, when the detector performs imaging when spinning, the deformation at two sides of the imaging region is large, taking into account the distance between the two orbits, i.e., between the two imaging regions, the distance $L_6$ between the imaging regions in the direction perpendicular to the direction along the orbit is reduced, that is, the overlapped region between the two orbits uses a manner of two-orbit data splicing; as shown in FIG. 7;

thus, in step 7, in a case that in a sun synchronous orbit with the height of the orbit of the satellite being h, time for the satellite to go around the earth once is T, one day the satellites goes around the earth for about Q circles, and a perimeter of the equator is l, a distance between the adjacent two orbits, at the equator, is $L_3=l/Q$, and in a case that an inclination angle of the orbit is σ, a straight line distance between the two orbits is $L_4=L_3 \times \sin σ$, and by calculating the swath width $L_5$ known as being perpendicular to the orbit, the superimposed distance between imaging regions of the adjacent two orbits is calculated as $L_6=L_5-L_4$; and step 8 of reducing the value of $L_6$ during the image processing, if a deformation at both edges of the imaging region is large (for example, exceeds a predetermined range), that is, in the case that the seamless slicing between the two orbits is ensured, the overlapped region between the two orbits can be further reduced, to avoid the image deformation caused by the deformation at both edges of the imaging region, while achieving the super large swath width.

The Effect of the Present Implementations

The implementation proposes a method for achieving super large swath width whiskbroom imaging by rapid rotation of satellites on the basis of conventional satellite pushbroom imaging and whiskbroom imaging. The linear array CCD and the flight directions of the satellite are parallel, and by the detector continuously spinning for 360° with the fast rotation velocity of 1~10°/s; performing the whiskbroom and pushbroom at the same time, the satellite's imaging coverage on the ground can be maximized so as to achieve super large swath width whiskbroom imaging with thousands of kilometers for satellites in middle and low orbits.

With the conventional pushbroom imaging and whiskbroom imaging, if it is required to completely cover a certain region, it is necessary to repeatedly visit the region several times, that is, multi-orbit data splicing; although the coverage capacity for the region can be increased with the whiskbroom capacity, the temporal resolution and coverage capacity for one-time acquiring ground data cannot meet current task requirements of the rapid response of the satellite.

The implementation takes the maneuver ability and imaging capability of the satellite into account, and according to the changes of the attitude angle and the attitude angular velocity of the satellite's dynamic imaging and the influence of the dynamic changes on the imaging, a method for achieving one-time imaging with large range of coverage, by making the optical axis of the detector rotate in the forward direction of the satellite to perform imaging in the direction along the orbit or not along the orbit, during the flight of the satellite is designed. The implementation discloses a method and an apparatus for rapidly rotating whiskbroom imaging with a super large swath width for the satellite, which is for the problem of limited swath width in the pushbroom imaging and whiskbroom imaging methods used in the traditional remote sensing satellite. In the satellite flight process, the detector's axis goes forward slowly with the advance of the satellite; as the detector rotates with a uniform speed for 360°, moving left or right, the swath width of the imaging in the direction along the orbit or not along the orbit is made larger, to achieve a purpose of wide coverage range imaging. The method of the implementation is simple, reliable and easy to perform, and expands the pushbroom and whiskbroom imaging ranges, the application field of the pushbroom and whiskbroom satellites. The present implementation is the first reliable method for the rapidly rotating whiskbroom imaging with a super large swath width for the satellite with the large coverage area for expanding the imaging range.

The rotation of the detector can be achieved by the detector rotating relatively to a satellite platform or with an overall rotation of the whole satellite structure.

In order to achieve a large region detection on the ground by the satellite in a case of satellite advance and earth rotation, a satellite attitude control system can guarantee the detector to continuously rotate with a uniform speed for 360°. When imaging, the satellite attitude control system can perform real-time control of the satellite body coordinate system with respect to the three-axis attitude angle (roll angle φ, pitch angle θ, and yaw angle ψ) to ensure the detector to spin with a uniform speed, the selection of the spin velocity should ensure that during the process of the whiskbroom, there is no gap between the adjacent imaging regions, that is, to guarantee there is no gap between the imaging region 1 and the imaging region 2, as shown in FIG. 2.

A specific implementation 2:

The swath width $L_5$ perpendicular to the orbit described in step 6 is calculated as follows:

central angle is $$2\theta = \arccos\left(\frac{R}{R+h}\right);$$

The swath width perpendicular to the orbit $$L_5 = \overset{\frown}{AB} = \left(\frac{2\pi R}{360°}\right) \times 2\theta.$$

A specific implementation 3: The swath width $L_1$ of the flight direction described in step 1 is:

$$L_1 = 2 \times h \times \tan\left(\frac{\eta}{2}\right).$$

A specific implementation 4: $L_2$ in step 2 is calculated as follows:

$$L_2 = \Omega \times (R+h) \times \left(\frac{360°}{v_Z}\right).$$

Wherein, the angular velocity of the satellite on the orbit is $$\Omega = \frac{\sqrt{\frac{\mu}{R+h}}}{R+h},$$

the linear velocity is $\Omega \times (R+h)$, and the earth gravitational constant is $\mu=3.986006\times10^5$ km$^3$/s$^2$.

A specific implementation 5: the resolution $A_c$ corresponding to the different whiskbroom angle imaging described in step 4 is calculated as follows, as shown in FIG. 6:

The resolution of the corresponding lateral swivel angle imaging is calculated as follows:

$$\frac{R}{\sin \varphi} = \frac{R+h}{\sin \delta}$$

$$\alpha = \pi - \delta$$

$$\beta = \pi - \delta - \varphi$$

-continued
$$L_c = \sqrt{(R+h)^2 + R^2 - 2(R+h)R\cos(\beta)}$$

The resolution is:

$$A_c = L_c \times a/f \cos \alpha$$

δ is an included angle between a line of sight and the radius of the center of the earth, $L_c$ is the object distance, f is the focal length; a is the pixel size; φ is the swing angle of the satellite; α is a projection angle; and β is an angle of the center of the earth.

The benefits of the present implementation are verified by the following embodiments:

Embodiment 1:

In the present embodiment, a method for rapidly rotating whiskbroom imaging with a super large swath width is carried out according to the following steps:

Step 1, assuming the field angle of the detector is η=33.2°, the range of view field $L_1$ of the detector calculated according to the viewing angle and the height h of the orbit is:

$$L_1 = 2 \times h \times \tan\left(\frac{\eta}{2}\right) = 2 \times 500 \times \tan\left(\frac{\eta}{2}\right) \approx 298 \text{ km,}$$

as shown in FIG. 4.

Step 2, there being no gap between the two adjacent imaging regions of the detector can achieve a super large swath width, and the imaging regions can be seen in FIG. 2, that is, a distance $L_2$ between centers of an optical axis of the detector on a track of the subsatellite point on a surface of the earth at two times of imaging should be less than or equal to the swath width $L_1$ of the flight direction, thus, it is considered that a critical value of $L_2$ is the swath width $L_1$ of the flight direction, and $L_2$ is calculated as follows:

$$L_2 = \Omega \times (R+h) \times \left(\frac{360°}{v_Z}\right)$$

wherein, the angular velocity of the satellite on the orbit is $$\Omega = \frac{\sqrt{\frac{\mu}{R+h}}}{R+h},$$

the linear velocity is $\Omega \times (R+h)$, and the spin velocity of the detector around the direction along the orbit is $v_Z$, wherein the earth gravitational constant is $\mu=3.986006\times10^5$ km³/s².

Step 3, taking the critical value $L_2=L_1=298$ km into the following formula to calculate the spin speed threshold of the detector around the direction along the orbit:

$$v_Z = \frac{\Omega \times (R+h) \times 360°}{L_2} = 9.2°/s$$

it is possible to satisfy there being no gap between the two adjacent imaging regions of the detector when the spin velocity of the detector around the direction along the orbit is greater than or equal to $v_Z$, and if it is below $v_Z$, there may be a gap between the two imaging regions, and the super large swath width imaging cannot be achieved;

by setting the spin velocity of the detector around the direction along the orbit as being not lower than 9.2°/s, there being no gap between the two adjacent imaging regions of the detector can achieve super large swath width imaging, but if it is less than 9.2°/s, there may be a gap between the two imaging regions.

As mentioned earlier, the resolution of the ground surface of the detector is largely related to the size of its whiskbroom angle, so with the method for rapidly rotating whiskbroom imaging with a super large swath width for the satellite can provide a large range of the whiskbroom angle by the 360° rotation of the detector, but it is not true that the larger the whiskbroom angle is, the higher the resolution of the detector is. Only in a certain range of the whiskbroom angle, in the same orbit condition, the larger the whiskbroom angle is, the higher the resolution of the detector is. Taking two aspects of the requirements of the high resolution and ground strap seamless splicing into account, it may be necessary to for the imaging swath width and the resolution $A_c$ to constrain each other.

This is because when the whiskbroom angle of satellite is very large, the degree of the tangency between the satellite and the earth's surface increases, in addition to the change of the satellite resolution with the change of the object distance of the whiskbroom, the projection angle of the satellite on the ground also increases, the geometric resolution corresponding to the imaging has serious deformation, so there will be a serious decline in the resolution, as shown in FIG. 5; at this point, in order to reduce or eliminate the deformation of the geometric resolution corresponding to the imaging, the step 4 combines inherent characteristic parameters of the detector to select different swing angles to calculate a corresponding resolution $A_c$ when the detector achieves the imaging with a super large swath width under various orbit conditions; the correspondence between the whiskbroom angle of the satellite and the resolution is as shown in FIG. 6; wherein, the inherent characteristic parameters of the detector include a pixel size and a focal length;

the resolution to which different whiskbroom angle imaging corresponding is calculated as follows, as shown in FIG. 6:

$$\frac{R}{\sin \varphi} = \frac{R+h}{\sin \delta}$$

$$\alpha = \pi - \delta$$

$$\beta = \pi - \delta - \varphi$$

$$L_c = \sqrt{(R+h)^2 + R^2 - 2(R+h)R\cos(\beta)}$$

The resolution is:

$$A_c = L_c \times a/f \cos \alpha$$

δ is an included angle between a line of sight and the radius of the center of the earth, $L_c$ is the object distance, f is the focal length; a is the pixel size; φ is the swing angle of the satellite; α is a projection angle; and β is an angle of the center of the earth.

Step 5, the spin velocity threshold $v_Z$ of the detector and the resolution $A_c$ also determine the amount of the line frequency $F_p$, while the CCD devices all have their own limit line frequency, and the detector cannot perform normal imaging when going beyond the limit line frequency, thus, the CCD line frequency $F_p$ is calculated according to the detector's spin velocity threshold $v_Z$ and the resolution $A_c$:

$$F_p = \frac{\sqrt{(v_Z \times L_c)^2 + (\Omega \times (R+h))^2}}{A_c}$$

assuming that the focal length of the detector is f=1.18 m, the pixel size is a=3.5 μm and at this time, the corresponding resolution of the subsatellite point is $A_c$=500 km×3.5 μm/1.18 m=1.5 m. When the detector's whiskbroom angle is taken as φ=45°, the corresponding resolution is $A_c$=3.4 m, when the satellite's whiskbroom angle is φ=60°, the corresponding resolution of the surface of the ground is $A_c$=9.6 m. When the spin velocity of the detector is greater than or equal to $v_Z$=9.2°/s, the seamless splicing between imaging regions of the adjacent two orbits can be achieved. At this time, taking $A_c$=1.5 m, h is the height of the orbit, h=500 km, and the corresponding CCD line frequency is $F_p$=54K.

Figure 3:
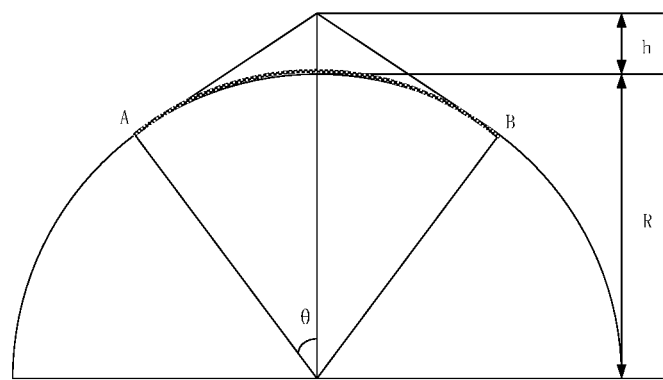
FIG. 3 is a schematic diagram of the calculation of the swath width perpendicular to the orbit proposed in the specific implementation 1.

Step 6, assuming that the height of the orbit of the satellite is h=500 km, taking the radius of the earth R=6371 km, a curve distance $\overset{\frown}{AB}$ between A and B points on a curve of the orbit of the satellite to which a central angle 2θ corresponds is calculated, wherein the $\overset{\frown}{AB}$, i.e., the swath width $L_5$ perpendicular to the orbit is calculated as follows:

central angle is $$2\theta = \arccos\left(\frac{R}{R+h}\right) \approx 44°;$$

the swath width perpendicular to the orbit $$L_5 = \overset{\frown}{AB} = \left(\frac{2\pi R}{360°}\right) \times 2\theta = \left(\frac{2\pi R}{360°}\right) \times 44° \approx 4890 \text{ km},$$

as shown in FIG. 3.

Step 7, as shown in FIG. 2, when the detector performs imaging when spinning, the deformation at two sides of the imaging region is large, taking into account the distance between the two orbits, i.e., between the two imaging regions, the distance $L_6$ between the imaging regions in the direction perpendicular to the direction along the orbit is reduced, that is, the overlapped region between the two orbits uses a manner of two-orbit data splicing; as shown in FIG. 7;

it is known that the height of the orbit of the satellite is h=500 km of the sun synchronous orbit, time for the satellite to go around the earth once is T=5676.98 s, one day the satellites goes around the earth for about Q=15.2 circles, and a perimeter of the equator is l=40000 km, a distance between the adjacent two orbits, at the equator, is $L_3$=l/Q=40000 km/15.2≈2631.6 k, and in a case that an inclination angle of the orbit is σ=97.4°, a straight line distance between the two orbits is $L_4$=$L_3$×sin σ=2631.6 km×sin 97.4°≈2609.7 km, and by the maximum of the calculated swath width $L_5$ known as being perpendicular to the orbit being 4890 km, the superimposed distance between imaging regions of the adjacent two orbits is calculated as $L_6$=$L_5$-$L_4$=4890 km-2609.7 km=2280.3 km;

Step 8, if a deformation at both edges of the imaging region is large, the value of $L_6$ may be reduced during the image processing, that is, in the case that the seamless splicing between the two orbits is ensured, the overlapped region between the two orbits can be further reduced, to avoid the image deformation caused by the deformation at both edges of the imaging region, while achieving the super large swath width.

Figure 8:
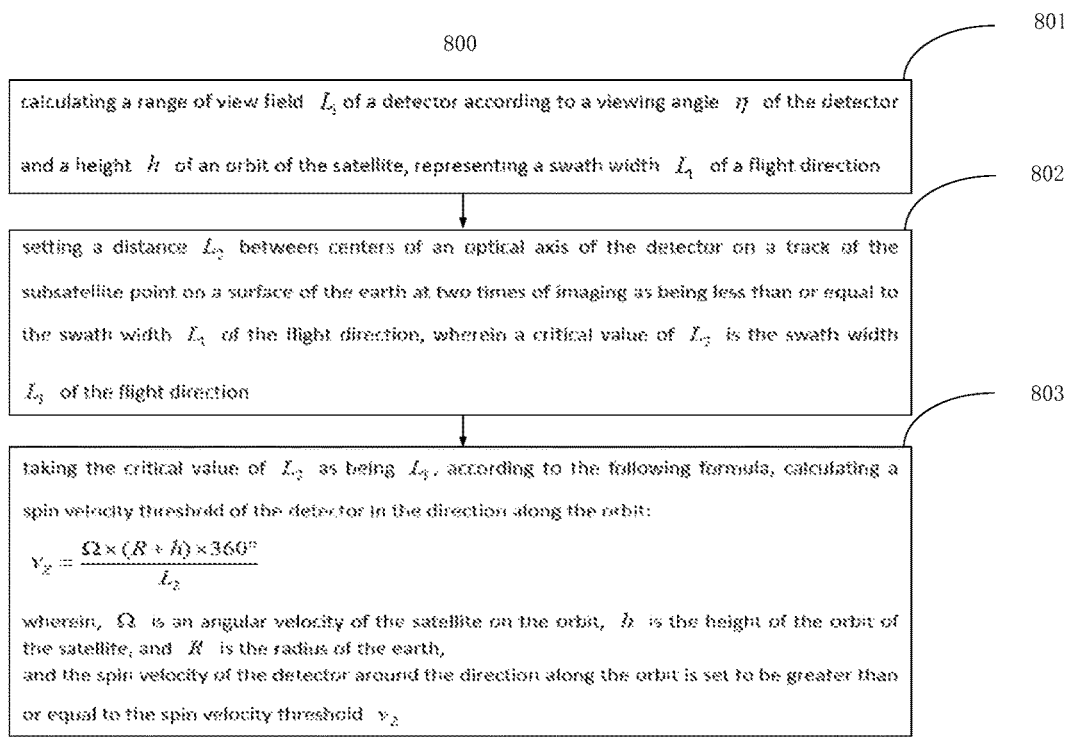
FIG. 8 is a flow chart of a method for rapidly rotating whiskbroom imaging with a super large swath width, according to an implementation of the present invention.

FIG. 8 is a flow chart of a method 800 for rapidly rotating whiskbroom imaging with a super large swath width according to an implementation of the present invention.

The method 800 shown in FIG. 8 includes: step 801 of calculating a range of view field $L_1$ of a satellite's detector according to a viewing angle η of the detector and a height h of an orbit of the satellite, representing a swath width $L_1$ of a flight direction;

step 802 of setting a distance $L_2$ between centers of an optical axis of the detector on a track of the subsatellite point on a surface of the earth at two times of imaging as being less than or equal to the swath width $L_1$ of the flight direction, wherein, a critical value of $L_2$ is the swath width $L_1$ of the flight direction; and step 803 of taking the critical value of $L_2$ as being $L_1$ according to the following formula, calculating a spin velocity threshold of the detector in the direction along the orbit:

$$v_Z = \frac{\Omega \times (R+h) \times 360°}{L_2}$$

wherein, Ω is an angular velocity of the satellite on the orbit, h is the height of the orbit of the satellite, and R is the radius of the earth, and the spin velocity of the detector around the direction along the orbit is set to be greater than or equal to the spin velocity threshold $v_Z$.

In one embodiment, the method 800 may further comprise:

step 804 of combining inherent characteristic parameters of the detector to select different swing angles to calculate a corresponding resolution $A_c$ when the detector achieves the imaging with a super large swath width under various orbit conditions, wherein, the inherent characteristic parameters of the detector include a pixel size and a focal length;

step 805 of calculating the detector's charge-coupled device CCD's line frequency $F_p$ according to the detector's spin velocity threshold $v_Z$ and the resolution $A_c$:

$$F_p = \frac{\sqrt{(v_Z \times L_c)^2 + (\Omega \times (R+h))^2}}{A_c}$$

wherein $L_c$ is an object distance, step 806 of calculating a curve distance $\overset{\frown}{AB}$ between A and B points on a curve of the orbit of the satellite to which a central angle 2θ corresponds, according to the height h of the orbit of the satellite and the radius of the earth R, wherein the curve distance $\overset{\frown}{AB}$ represents the swath width $L_5$ perpendicular to the orbit of the satellite;

step 807 of, in a case that in a sun synchronous orbit with the height of the orbit of the satellite being h, time for the satellite to go around the earth once is T, one day the satellites goes around the earth for about Q circles, and a perimeter of the equator is l, a distance between the adjacent two orbits, at the equator, is $L_3$=l/Q, and in a case that an inclination angle of the orbit is σ, a straight line distance between the two orbits is $L_4$=$L_3$×sin σ, and by calculating the swath width $L_5$ known as being perpendicular to the orbit, the superimposed distance between imaging regions of the adjacent two orbits is calculated as $L_6=L_5-L_4$; and step 808 of reducing the value of $L_6$ when a deformation at both edges of the imaging region exceeds a predetermined range.

In one embodiment, said swath width $L_5$ perpendicular to the orbit in step 806 is calculated by the following formula: central angle is $$2\theta = \arccos\left(\frac{R}{R+h}\right);$$

Where the swath width perpendicular to the orbit is $$L_5 = \overset{\frown}{AB} = \left(\frac{2\pi R}{360°}\right) \times 2\theta.$$

In one embodiment, the swath width $L_1$ of said flight direction in step 801 is calculated by the following formula:

$$L_1 = 2 \times h \times \tan\left(\frac{\eta}{2}\right).$$

In one embodiment, the distance $L_2$ in step 802 is calculated by the following formula:

$$L_2 = \Omega \times (R+h) \times \left(\frac{360°}{v_Z}\right)$$

wherein, the angular velocity of the satellite on the orbit is $$\Omega = \frac{\sqrt{\frac{\mu}{R+h}}}{R+h},$$

a line velocity is $\Omega \times (R+h)$, and $\mu$ is the earth gravitational constant.

In one embodiment, the corresponding resolution $A_c$ in step 804 is calculated by the following formula:

$$\frac{R}{\sin\varphi} = \frac{R+h}{\sin\delta}$$

$$\alpha = \pi - \delta$$

$$\beta = \pi - \delta - \varphi$$

$$L_c = \sqrt{(R+h)^2 + R^2 - 2(R+h)R\cos(\beta)}$$

and the resolution is:

$$A_c = L_c \times a/f/\cos\alpha$$

Wherein $\delta$ is an included angle between a line of sight and the radius of the center of the earth, $L_c$ is the object distance, f is the focal length; a is the pixel size; $\varphi$ is the swing angle of the satellite; $\alpha$ is a projection angle; and $\beta$ is an angle of the center of the earth.

Figure 9:
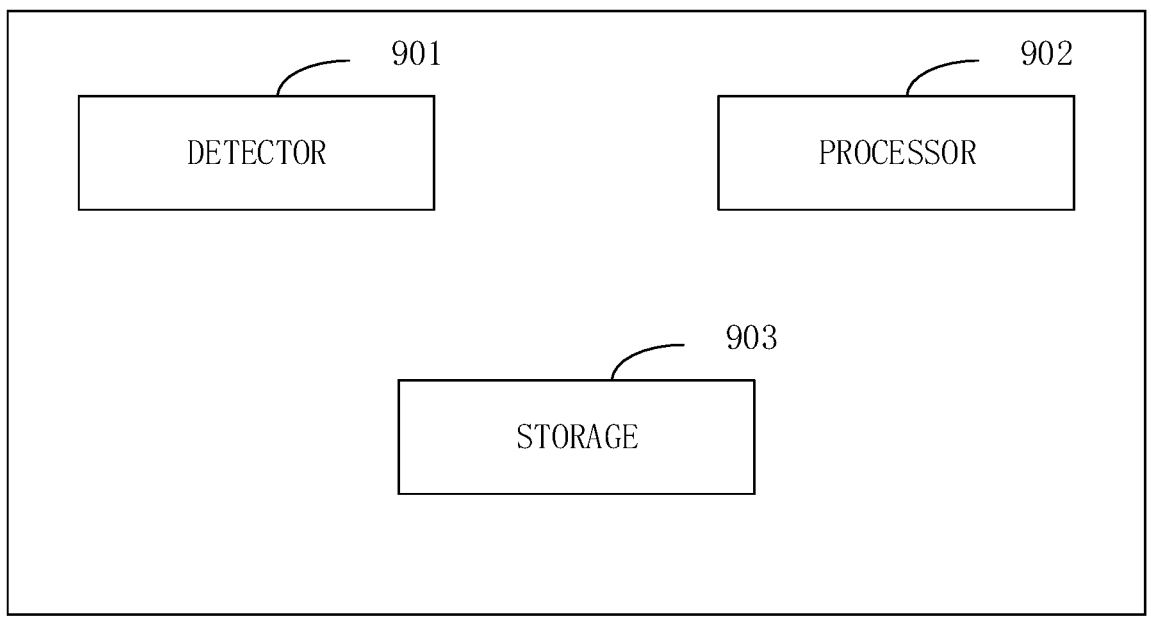
FIG. 9 is a block diagram of an apparatus according to an implementation of the present invention.

FIG. 9 is a block diagram of an apparatus 900 according to an implementation of the present invention.

The apparatus shown in FIG. 9 includes: a detector 901 for imaging; a processor 902; and a storage 903, coupled with the processor, storing computer executable instructions when run by the processor, to execute a method comprising the following steps:

step 1 of calculating a range of view field $L_1$ of a satellite's detector according to a viewing angle $\eta$ of the detector and a height h of an orbit of the satellite, representing a swath width $L_1$ of a flight direction;

step 2 of setting a distance $L_2$ between centers of an optical axis of the detector on a track of the subsatellite point on a surface of the earth at two times of imaging as being less than or equal to the swath width $L_1$ of the flight direction, wherein a critical value of $L_2$ is the swath width $L_1$ of the flight direction; and step 3 of taking the critical value of $L_2$ as being $L_1$, according to the following formula, calculating a spin velocity threshold of the detector in the direction along the orbit:

$$v_Z = \frac{\Omega \times (R+h) \times 360°}{L_2}$$

wherein, $\Omega$ is an angular velocity of the satellite on the orbit, h is the height of the orbit of the satellite, and R is the radius of the earth, and the spin velocity of the detector around the direction along the orbit is set to be greater than or equal to the spin velocity threshold $v_Z$.

In one embodiment, the computer executable instructions stored in the storage, when run by the processor, further execute the method comprising the following steps:

step 4 of combining inherent characteristic parameters of the detector to select different swing angles to calculate a corresponding resolution $A_c$ when the detector achieves the imaging with a super large swath width under various orbit conditions, wherein, the inherent characteristic parameters of the detector include a pixel size and a focal length;

step 5 of calculating the detector's charge-coupled device CCD's line frequency $F_p$ according to the detector's spin velocity threshold $v_Z$ and the resolution $A_c$:

$$F_p = \frac{\sqrt{(v_Z + L_c)^2 + (\Omega \times (R+h))^2}}{A_c}$$

wherein $L_c$ is an object distance, step 6 of calculating a curve distance $\overset{\frown}{AB}$ between A and B points on a curve of the orbit of the satellite to which a central angle $2\theta$ corresponds, according to the height h of the orbit of the satellite and the radius of the earth R, wherein the curve distance $\overset{\frown}{AB}$ represents the swath width $L_5$ perpendicular to the orbit of the satellite;

step 7 of, in a case that in a sun synchronous orbit with the height of the orbit of the satellite being h, time for the satellite to go around the earth once is T, one day the satellites goes around the earth for about Q circles, and a perimeter of the equator is l, a distance between the adjacent two orbits, at the equator, is $L_3=l/Q$, and in a case that an inclination angle of the orbit is $\sigma$, a straight line distance between the two orbits is $L_4=L_3\times\sin\sigma$, and by calculating the swath width $L_5$ known as being perpendicular to the orbit, the superimposed distance between imaging regions of the adjacent two orbits is calculated as $L_6=L_5-L_4$; and step 8 of reducing the value of $L_6$ when a deformation at both edges of the imaging region exceeds a predetermined range.

In one embodiment, the swath width $L_5$ perpendicular to the orbit in step 6 is calculated by the following formula: central angle is $$2\theta = \arccos\left(\frac{R}{R+h}\right);$$

Where the swath width perpendicular to the orbit is $$L_5 = \overset{\frown}{AB} = \left(\frac{2\pi R}{360°}\right) \times 2\theta.$$

In one embodiment, the swath width $L_1$ of said flight direction in step 1 is calculated by the following formula:

$$L_1 = 2 \times h \times \tan\left(\frac{\eta}{2}\right).$$

In one embodiment, the distance $L_2$ in step 2 is calculated by the following formula:

$$L_2 = \Omega \times (R+h) \times \left(\frac{360°}{v_Z}\right)$$

wherein, the angular velocity of the satellite on the orbit is $$\Omega = \frac{\sqrt{\frac{\mu}{R+h}}}{R+h},$$

a line velocity is $\Omega \times (R+h)$, and $\mu$ is the earth gravitational constant.

In one embodiment, the corresponding resolution $A_c$ in step 4 is calculated by the following formula:

$$\frac{R}{\sin\varphi} = \frac{R+h}{\sin\delta}$$
$$\alpha = \pi - \delta$$
$$\beta = \pi - \delta - \varphi$$
$$L_c = \sqrt{(R+h)^2 + R^2 - 2(R+h)R\cos(\beta)}$$

and the resolution is:

$A_c = L_c \times a/f/\cos\alpha$

Wherein $\delta$ is an included angle between a line of sight and the radius of the center of the earth, $L_c$ is the object distance, f is the focal length; a is the pixel size; $\varphi$ is the swing angle of the satellite; $\alpha$ is a projection angle; and $\beta$ is an angle of the center of the earth.

It is obvious that the above-described embodiments are merely for the purpose of clearly illustrating the examples made and are not intended to limit the implementation. It will be apparent to those skilled in the art that other various changes or variations may be made by those skilled in the art on the basis of the above description. There is no need and no way to be exhaustive all the implementation. And the obvious changes or variations thus recited are still within the scope of protection created by the present invention.

The present implementation may be embodied in various other embodiments, and various changes and modifications may be made by those skilled in the art without departing from the spirit and substance of the present implementation, but these corresponding changes and modifications may be made within the scope of the claims appended hereto.

The invention claimed is:

1. A method for rapidly rotating whiskbroom imaging with a super large swath width, characterized in that the method comprises:
step 1 of calculating a range of view field $L_1$ of a satellite's detector according to a viewing angle $\eta$ of the detector and a height h of an orbit of the satellite, representing a swath width $L_1$ of a flight direction;
step 2 of setting a distance $L_2$ between centers of an optical axis of the detector on a track of the sub-satellite point at two times of imaging as being less than or equal to the swath width $L_1$ of the flight direction, wherein a critical value of $L_2$ is the swath width $L_1$ of the flight direction; and
step 3 of taking the critical value of $L_2$ as being $L_1$ according to the following formula, calculating a spin velocity threshold of the detector in the direction along the orbit:

$$v_Z = \frac{\Omega \times (R+h) \times 360°}{L_2}$$

wherein, $\Omega$ is an angular velocity of the satellite on the orbit, h is the height of the orbit of the satellite, and R is the radius of the earth,
and in the step 3, the spin velocity of the detector around the direction along the orbit is set to be greater than or equal to the spin velocity threshold $v_Z$.

2. The method according to claim 1, further comprising:
step 4 of combining inherent characteristic parameters of the detector to select different swing angles to calculate a corresponding resolution $A_c$ when the detector achieves the imaging with a super large swath width under various orbit conditions, wherein, the inherent characteristic parameters of the detector include a pixel size and a focal length;
step 5 of calculating the detector's charge-coupled device CCD's line frequency $F_p$ according to the detector's spin velocity threshold $v_Z$ and the resolution $A_c$:

$$F_p = \frac{\sqrt{(v_Z \times L_c)^2 + (\Omega \times (R+h))^2}}{A_c}$$

wherein $L_c$ is an object distance,
step 6 of calculating a curve distance $\overset{\frown}{AB}$ between A and B points on a curve of the orbit of the satellite to which a central angle $2\theta$ corresponds, according to the height h of the orbit of the satellite and the radius of the earth R, wherein the curve distance $\overset{\frown}{AB}$ represents the swath width $L_5$ perpendicular to the orbit of the satellite;
step 7 of, in a case that in a sun synchronous orbit with the height of the orbit of the satellite being h, time for the satellite to go around the earth once is T, one day the satellites goes around the earth for about Q circles, and a perimeter of the equator is I, a distance between the adjacent two orbits, at the equator, is $L_3=I/Q$, and in a case that an inclination angle of the orbit is σ, a straight line distance between the two orbits is $L_4=L_3 \times \sin σ$, and by calculating the swath width $L_5$ known as being perpendicular to the orbit, the superimposed distance between imaging regions of the adjacent two orbits is calculated as $L_6=L_5-L_4$; and step 8 of reducing the value of $L_6$ when a deformation at both edges of the imaging region exceeds a predetermined range.

3. The method according to claim 2, characterized in that the swath width $L_5$ perpendicular to the orbit in step 6 is calculated by the following formula:

central angle is $$2\theta = \arccos\left(\frac{R}{R+h}\right);$$

Where the swath width perpendicular to the orbit is $$L_5 = \widehat{AB} = \left(\frac{2\pi R}{360°}\right) \times 2\theta.$$

4. The method according to claim 1, characterized in that the swath width $L_1$ of the flight direction in step 1 is calculated by the following formula:

$$L_1 = 2 \times h \times \tan\left(\frac{\eta}{2}\right).$$

5. The method according to claim 1, characterized in that the distance $L_2$ in step 2 is calculated by the following formula:

$$L_2 = \Omega \times (R+h) \times \left(\frac{360°}{v_Z}\right)$$

wherein, the angular velocity of the satellite on the orbit is $$\Omega = \frac{\sqrt{\frac{\mu}{R+h}}}{R+h},$$

a line velocity is $\Omega \times (R+h)$, and μ is the earth gravitational constant.

6. The method according to claim 2, characterized in that the corresponding resolution $A_c$ in step 4 is calculated by the following formula:

$$\frac{R}{\sin \varphi} = \frac{R+h}{\sin \delta}$$

$$\alpha = \pi - \delta$$

$$\beta = \pi - \delta - \varphi$$

-continued $$L_c = \sqrt{(R+h)^2 + R^2 - 2(R+h)R \cos(\beta)}$$

and the resolution is:

$$A_c = L_c \times a/f \cos \alpha$$

Wherein δ is an included angle between a line of sight and the radius of the center of the earth, $L_c$ is the object distance, f is the focal length; a is the pixel size; φ is the swing angle of the satellite; α is a projection angle; and β is an angle of the center of the earth.

7. An apparatus for rapidly rotating whiskbroom imaging with a super large swath width, characterized in that the apparatus comprises:

a detector for imaging;

a processor for image processing, coupled with a storage; and the storage, coupled with the processor, storing computer executable instructions when run by the processor, to execute a method comprising the following steps:

step 1 of calculating a range of view field $L_1$ of the detector according to a viewing angle η of the detector and a height h of an orbit of a satellite, representing a swath width $L_1$ of a flight direction;

step 2 of setting a distance $L_2$ between centers of an optical axis of the detector on a track of the subsatellite point on a surface of the earth at two times of imaging as being less than or equal to the swath width $L_1$ of the flight direction, wherein a critical value of $L_2$ is the swath width $L_1$ of the flight direction; and step 3 of taking the critical value of $L_2$ as being $L_1$, according to the following formula, calculating a spin velocity threshold of the detector in the direction along the orbit:

$$v_Z = \frac{\Omega \times (R+h) \times 360°}{L_2}$$

wherein, Ω is an angular velocity of the satellite on the orbit, h is the height of the orbit of the satellite, and R is the radius of the earth, and in the step 3, the spin velocity of the detector around the direction along the orbit is set to be greater than or equal to the spin velocity threshold $v_Z$.

8. The apparatus according to claim 7, characterized in that the computer executable instructions stored in the storage, when run by the processor, further execute the method comprising the following steps:

step 4 of combining inherent characteristic parameters of the detector to select different swing angles to calculate a corresponding resolution $A_c$ when the detector achieves the imaging with a super large swath width under various orbit conditions, wherein, the inherent characteristic parameters of the detector include a pixel size and a focal length;

step 5 of calculating the detector's charge-coupled device CCD's line frequency $F_p$ according to the detector's spin velocity threshold $v_Z$ and the resolution $A_c$:

$$F_p = \frac{\sqrt{(v_Z \times L_c)^2 + (\Omega \times (R+h))^2}}{A_c}$$

wherein $L_c$ is an object distance, step 6 of calculating a curve distance $\overset{\frown}{AB}$ between A and B points on a curve of the orbit of the satellite to which a central angle $2\theta$ corresponds, according to the height h of the orbit of the satellite and the radius of the earth R, wherein the curve distance $\overset{\frown}{AB}$ represents the swath width $L_5$ perpendicular to the orbit of the satellite;

step 7 of, in a case that in a sun synchronous orbit with the height of the orbit of the satellite being h, time for the satellite to go around the earth once is T, one day the satellites goes around the earth for about Q circles, and a perimeter of the equator is I, a distance between the adjacent two orbits, at the equator, is $L_3 = I/Q$, and in a case that an inclination angle of the orbit is $\sigma$, a straight line distance between the two orbits is $L_4 = L_3 \times \sin\sigma$, and by calculating the swath width $L_5$ known as being perpendicular to the orbit, the superimposed distance between imaging regions of the adjacent two orbits is calculated as $L_6 = L_5 - L_4$; and step 8 of reducing the value of $L_6$ when a deformation at both edges of the imaging region exceeds a predetermined range.

9. The apparatus according to claim 8, characterized in that said swath width $L_5$ perpendicular to the orbit in step 6 is calculated by the following formula:

central angle is $$2\theta = \arccos\left(\frac{R}{R+h}\right);$$

Where the swath width perpendicular to the orbit is $$L_5 = \overset{\frown}{AB} = \left(\frac{2\pi R}{360°}\right) \times 2\theta.$$

10. The apparatus according to claim 7, characterized in that the swath width $L_1$ of the flight direction in step 1 is calculated by the following formula:

$$L_1 = 2 \times h \times \tan\left(\frac{\eta}{2}\right).$$

11. The apparatus according to claim 7, characterized in that the distance $L_2$ in step 2 is calculated by the following formula:

$$L_2 = \Omega \times (R+h) \times \left(\frac{360°}{v_Z}\right)$$

wherein, the angular velocity of the satellite on the orbit is $$\Omega = \frac{\sqrt{\frac{\mu}{R+h}}}{R+h},$$

a line velocity is $\Omega \times (R+h)$, and $\mu$ is the earth gravitational constant.

12. The apparatus according to claim 8, characterized in that the corresponding resolution $A_c$ in step 4 is calculated by the following formula:

$$\frac{R}{\sin\varphi} = \frac{R+h}{\sin\delta}$$

$$\alpha = \pi - \delta$$

$$\beta = \pi - \delta - \varphi$$

$$L_c = \sqrt{(R+h)^2 + R^2 - 2(R+h)R\cos(\beta)}$$

and the resolution is:

$$A_c = L_c \times a/f/\cos\alpha$$

Wherein $\delta$ is an included angle between a line of sight and the radius of the center of the earth, $L_c$ is the object distance, f is the focal length; a is the pixel size; $\varphi$ is the swing angle of the satellite; $\alpha$ is a projection angle; and $\beta$ is an angle of the center of the earth.

13. A non-transitory computer readable medium, storing computer executable instructions thereon, the computer executable instructions, when being run by a processor, performing a method for rapidly rotating whiskbroom imaging with a super large swath width, characterized in that the method comprises:

step 1 of calculating a range of view field $L_1$ of a satellite's detector according to a viewing angle $\eta$ of the detector and a height h of an orbit of the satellite, representing a swath width $L_1$ of a flight direction;

step 2 of setting a distance $L_2$ between centers of an optical axis of the detector on a track of the subsatellite point on a surface of the earth at two times of imaging as being less than or equal to the swath width $L_1$ of the flight direction, wherein a critical value of $L_2$ is the swath width $L_1$ of the flight direction; and step 3 of taking the critical value of $L_2$ as being $L_1$, according to the following formula, calculating a spin velocity threshold of the detector in the direction along the orbit:

$$v_Z = \frac{\Omega \times (R+h) \times 360°}{L_2}$$

wherein, $\Omega$ is an angular velocity of the satellite on the orbit, h is the height of the orbit of the satellite, and R is the radius of the earth, and in the step 3, the spin velocity of the detector around the direction along the orbit is set to be greater than or equal to the spin velocity threshold $v_Z$.

14. The method according to claim 13, further comprising:

step 4 of combining inherent characteristic parameters of the detector to select different swing angles to calculate a corresponding resolution $A_c$ when the detector achieves the imaging with a super large swath width under various orbit conditions, wherein, the inherent characteristic parameters of the detector include a pixel size and a focal length;

step 5 of calculating the detector's charge-coupled device CCD's line frequency $F_p$ according to the detector's spin velocity threshold $v_Z$ and the resolution $A_c$:

$$F_p = \frac{\sqrt{(v_Z \times L_c)^2 + (\Omega \times (R+h))^2}}{A_c}$$

wherein $L_c$ is an object distance, step 6 of calculating a curve distance $\overset{\frown}{AB}$ between A and B points on a curve of the orbit of the satellite to which a central angle $2\theta$ corresponds, according to the height h of the orbit of the satellite and the radius of the earth R, wherein the curve distance $\overset{\frown}{AB}$ represents the swath width $L_5$ perpendicular to the orbit of the satellite;

step 7 of, in a case that in a sun synchronous orbit with the height of the orbit of the satellite being h, time for the satellite to go around the earth once is T, one day the satellites goes around the earth for about Q circles, and a perimeter of the equator is I, a distance between the adjacent two orbits, at the equator, is $L_3$=I/Q, and in a case that an inclination angle of the orbit is σ, a straight line distance between the two orbits is $L_4=L_3\times\sin\sigma$, and by calculating the swath width $L_5$ known as being perpendicular to the orbit, the superimposed distance between imaging regions of the adjacent two orbits is calculated as $L_6=L_5-L_4$; and step 8 of reducing the value of $L_6$ when a deformation at both edges of the imaging region exceeds a predetermined range.

15. The method according to claim 14, characterized in that the swath width $L_5$ perpendicular to the orbit in step 6 is calculated by the following formula:

central angle is $$2\theta = \arccos\left(\frac{R}{R+h}\right);$$

wherein the swath width perpendicular to the orbit is $$L_5 = \overset{\frown}{AB} = \left(\frac{2\pi R}{360°}\right) \times 2\theta.$$

16. The method according to claim 13, characterized in that the swath width $L_1$ of the flight direction in step 1 is calculated by the following formula:

$$L_1 = 2 \times h \times \tan\left(\frac{\eta}{2}\right).$$

17. The method according to claim 13, characterized in that the distance $L_2$ in step 2 is calculated by the following formula:

$$L_2 = \Omega \times (R+h) \times \left(\frac{360°}{v_Z}\right)$$

wherein, the angular velocity of the satellite on the orbit is $$\Omega = \frac{\sqrt{\frac{\mu}{R+h}}}{R+h},$$

a line velocity is $\Omega\times(R+h)$, and μ is the earth gravitational constant.

18. The method according to claim 14, characterized in that the corresponding resolution $A_c$ in step 4 is calculated by the following formula:

$$\frac{R}{\sin\varphi} = \frac{R+h}{\sin\delta}$$

$$\alpha = \pi - \delta$$

$$\beta = \pi - \delta - \varphi$$

$$L_c = \sqrt{(R+h)^2 + R^2 - 2(R+h)R\cos(\beta)}$$

and the resolution is:

$$A_c = L_c \times a/f \cos\alpha$$

wherein δ is an included angle between a line of sight and the radius of the center of the earth, $L_c$ is the object distance, f is the focal length; a is the pixel size; φ is the swing angle of the satellite; α is a projection angle; and β is an angle of the center of the earth.

* * * * *